Aug. 19, 1952  W. P. MASON  2,607,216
TORSIONAL INTERFEROMETER
Original Filed Aug. 16, 1946  2 SHEETS—SHEET 1
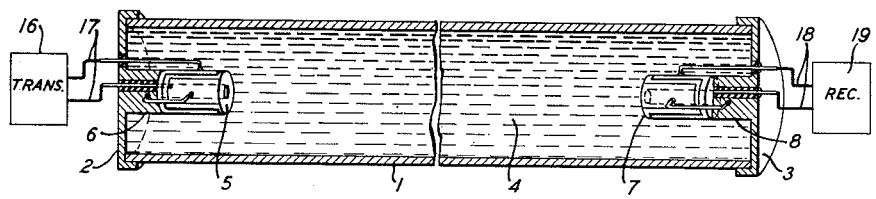
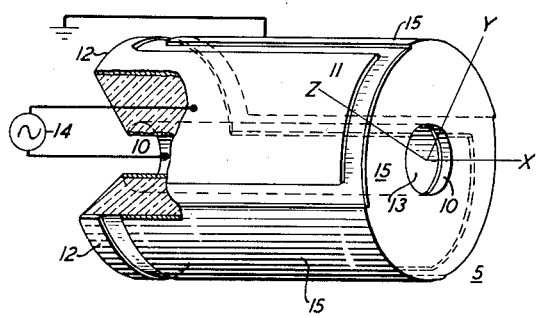 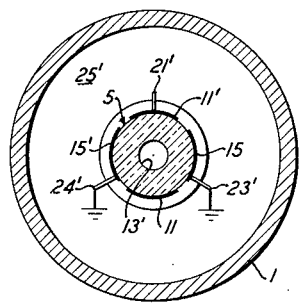
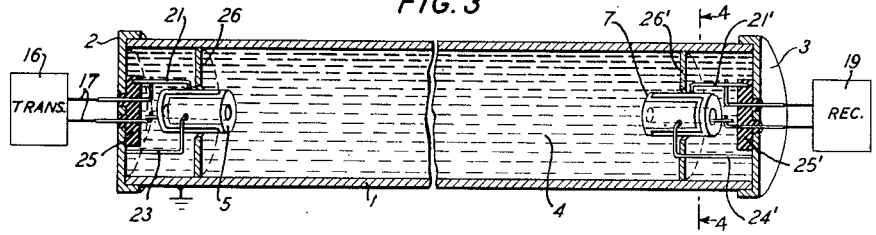
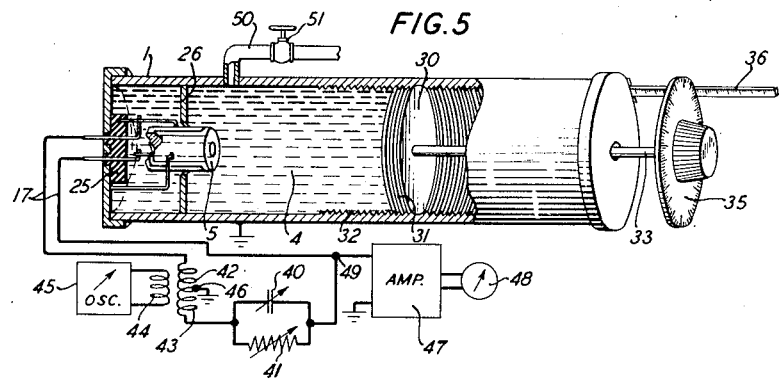
INVENTOR
W. P. MASON
BY Harry C. Hart
ATTORNEY Aug. 19, 1952  W. P. MASON  2,607,216
TORSIONAL INTERFEROMETER
Original Filed Aug. 16, 1946  2 SHEETS—SHEET 2
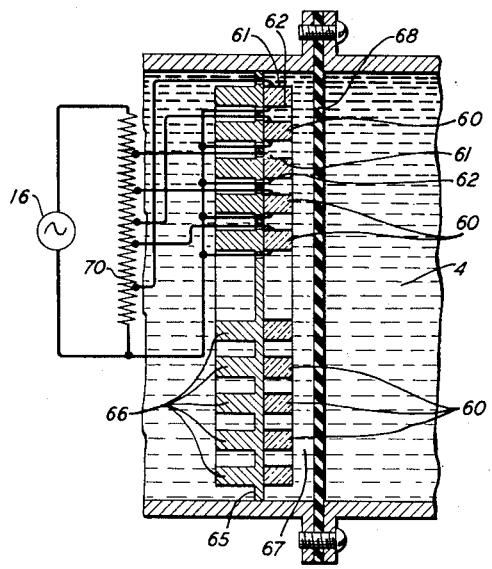
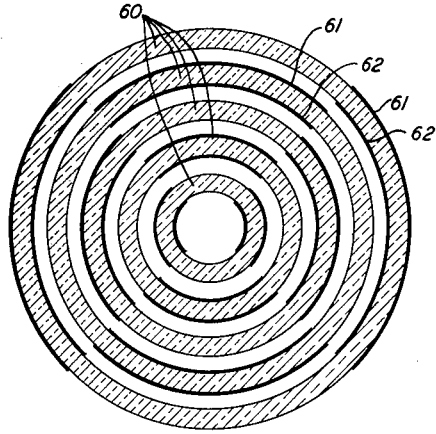
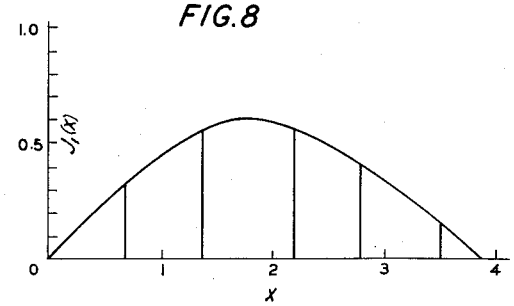
INVENTOR
W. P. MASON
BY
Harry C. Hart
ATTORNEY Patented Aug. 19, 1952

2,607,216

UNITED STATES PATENT OFFICE 2,607,216

TORSIONAL INTERFEROMETER

Warren P. Mason, West Orange, N. J., assignor to Bell Telephone Laboratories, Incorporated, New York, N. Y., a corporation of New York Original application August 16, 1946, Serial No. 690,870, now Patent No. 2,490,452, dated December 6, 1949. Divided and this application April 7, 1949, Serial No. 86,047

5 Claims. (Cl. 73—53)

This application is a division of a copending application of W. P. Mason, Serial No. 690,870, filed August 16, 1946, issued December 6, 1949, as Patent 2,490,452.

This invention relates to the generation and utilization of transverse fluid waves and to piezoelectric apparatus for launching and responding to such waves.

A principal object of the invention is to improve the coupling, for shear vibrations, between external signal generating circuits and a transverse wave-supporting fluid medium, with consequent improvement in the effectiveness of the wave launching apparatus. A related object is to improve the coupling from the medium to the wave-responsive pick-up apparatus.

Another object is to reduce the coupling, for longitudinal and lateral vibrations, from a signal generating circuit to the wave-supporting fluid and from the fluid to the pick-up or receiving circuit.

Another object is to restrict the oscillations of a fluid torsion wave to a desired mode or modes. A related object is to restrict the energy picked up by a receiving circuit from propagated fluid torsion waves to a desired mode or modes.

Another object is to facilitate experimental determination of liquid torsion wave lengths and frequencies.

Application Serial No. 690,863, filed August 16, 1946, now Patent 2,515,039 issued July 11, 1950, to R. V. L. Hartley, describes and claims a fluid transverse wave transmission system in which transverse waves, rectilinear or torsional, are generated by shearing forces derived from a transversely vibrating element such as a piezoelectric crystal and are launched into a fluid confined in a guiding conduit. Thereupon the waves are propagated through the fluid and travel to the far end of the guiding conduit where they are picked up by an appropriate element which responds to shearing forces exerted on it by the fluid. Such systems offer advantages as compared with compression wave transmission systems on account of the low propagation velocity which characterizes torsional waves, which permits the development of a substantial time delay between transmission of the wave and reception, in compact apparatus. The torsion waves have been experimentally observed, and their low propagation velocity experimentally determined, in the case of certain high viscosity liquids.

Specific objects of the invention are therefore to improve the effectiveness of launching of such transverse fluid waves into the wave-supporting fluid medium and similarly to improve the effectiveness of the shear-responsive pick-up device. Other specific objects are to facilitate the determination of transverse fluid wavelengths and improve the precision of measurements.

With these and other objects in view the invention provides a novel element for applying shearing forces to a shear-supporting fluid, which comprises a hollow cylindrical torsional vibrator which may be of crystalline ammonium dihydrogen phosphate (hereinafter abbreviated "ADP") with its axis of symmetry parallel with the X (or Y) crystalline axis and provided with electrodes on its internal and external faces normal to the Z or optical axis. The crystal vibrator may advantageously be provided with a shielding coat of metal foil or plating, covering the major part of its surface which is not occupied by exciting electrodes. The primary response of this element to a voltage applied between the internal electrode and the external electrodes is a torsional movement about the X (or Y) axis. This movement, when a moving face of the element is in contact with the fluid, applies a shearing force thereto in a fashion to initiate the formation of torsional waves. In a preferred form a plurality of such hollow cylindrical crystals may be provided, mounted concentrically with their Z axes in staggered arrangement, and energized together or separately, depending upon circumstances, as required. Such a system or arrangement displays a minimum of coupling between torsional modes and lateral or ring modes and also a minimum of coupling between torsional modes and axial or longitudinal modes of vibration. It therefore delivers substantially pure shearing forces to the fluid film with which it is in contact.

For the shear-responsive pick-up device, the same arrangement or a modified arrangement may be employed as desired.

In accordance with the invention the torsional crystal driving element is so constructed that the impedance which it presents to the electric generator or oscillator with which it is energized varies widely, both in magnitude and in sign, as the wave-supporting fluid with which it is in contact is varied in its characteristics of viscosity and elasticity. The impedance also varies widely as torsion waves which may be reflected from a reflecting member at the far end of the wave guide return to the driving element in phase or out of phase with the launched wave. Stated in other words, the impedance looking from the generator terminals into the crystal terminals when a standing wave pattern is established in the fluid differs widely from that which obtains when only traveling waves exist. Establishment and variation of the standing wave pattern may be effected, in accordance with the invention, by varying the distance of separation between the driving crystal element and the reflector. With such a construction, measurements of the impendance looking into the crystal terminals for various settings of the reflecting element give results from which the wavelengths of the torsional vibrations in the fluid can be determined in accordance with principles which are known in the wave transmission art.

It is contemplated that the novel torsional vibrator of the invention may find application in other combinations and for other uses than to launch transverse waves into a fluid or to respond piezoelectrically to such waves. Indeed, any of the novel elements above-described may equally be employed for delivering shearing forces to a solid medium or for reacting piezoelectrically to such shearing forces. For example, the solid medium may take the form of a rod or wire along which torsion waves may be propagated. Again, one or other of the novel elements might well serve as a tuning element or a filter element in an electric circuit.

The invention will be more fully understood from the following detailed description of preferred embodiments thereof in which it is applied to the launching and utilization of transverse fluid waves.

In the drawings:

Fig. 1 is a sectional schematic diagram of a torsion wave guide employing the novel driving and receiving piezoelectric crystal elements of the invention in one of its simpler forms;

Fig. 2 is an enlarged perspective view, partly in section, of a torsion crystal in accordance with the invention;

Fig. 3 is a longitudinal section of a modified torsion wave guide of Fig. 1 in which the driving and pick-up elements are differently mounted;

Fig. 4 is a cross-section of Fig. 3 taken on the line 4—4;

Fig. 5 is a schematic diagram, partly in section, illustrating the adaptation of the invention to the measurement of liquid torsional wavelengths;

Fig. 6, which is alternative to Fig. 2, is an end view of an array of concentrically mounted torsion crystals individually energized in accordance with a preferred form of the invention;

Fig. 7 is a sectional side view of the torsion crystal array of Fig. 6 mounted on a backing plate and showing electric connections; and Fig. 8 is a diagram of assistance in the exposition of a certain aspect of the invention.

Referring now to the figures, Fig. 1 shows a torsion wave guide 1 comprising a cylindrical tube closed at either end by end caps 2, 3 and filled with a suitable transverse wave-supporting fluid 4 such as liquid polyisobutylene or other high polymer. A driving element 5 which may, for example, be a simple torsional ADP crystal of cylindrical form is centrally mounted on the inner face of the end cap 2 or a central projection 6 thereof and a similar receiving element 7 is similarly mounted on the inner face of the other end cap 3. The crystals 5, 7 may be conveniently mounted by cementing or gluing one flat end surface to the inside face of the end cap projections 6, 8.

Either the driving crystal element or the receiving crystal element or both may be constructed as indicated in Fig. 2. The crystal is cut into the form of a hollow cylinder, the axial hole being perpendicular to the optical (Z) crystallographic axis and preferably aligned with the electrical (X) crystallographic axis of the material, and running lengthwise of the cylinder from end to end. Normal to the Z axis, and preferably centered thereon, are two exciting electrodes 11 of metal foil or plating, each of which occupies an arc of approximately 90 degrees. These two electrodes may be conveniently connected together by a conductive belt or ribbon 12 of foil or plating at the base of the torsional crystal. The other exciting electrode may consist of a rod of conductive material inserted within the axial hole or, more simply, the inner walls of the axial hole may be plated or provided with metal foil 13.

When an electric voltage is applied between the inside electrode and both external electrodes, as from a source schematically indicated at 14, this crystal responds in torsion, each end face turning about the cylinder axis with respect to the other end face.

This torsional movement is due to the production of shearing movements in opposite directions at opposite parts of the crystal. Thus an electric voltage applied between the inner electrode and the nearer (Fig. 2) external electrode causes the nearer half of the cylinder to undergo a shearing movement in one direction, for example, downward. Similarly, an electric voltage of the same magnitude applied between the inner electrode and the further external electrode causes the further half of the same cylinder to undergo a shearing movement upward. Because of the mechanical rigidity of the crystal as a whole, the composition of these two shearing movements results in a twist of one end with respect to the other. Substantial equality between the shearing movements of the two halves of the crystal, and consequently substantially pure torsion of the crystal as a whole, is ensured by substantially perfect equality between the electric fields in the upper and lower halves, respectively, of the cylindrical crystal. The conductive ribbon which connects the upper electrode to the lower external electrode ensures that these two external electrodes shall always remain at the same potential, and therefore that the potential difference between either one and the internal electrode shall be identical with that between the other external electrode and the internal electrode.

When the crystal is fixedly supported at one end, as indicated in Fig. 1, the twisting movement is greatest at the other end which is free. At the fundamental frequency to which the crystal resonates in torsion the crystal length is one-quarter wavelength in the crystal material and the twist increases sinusoidally from a value of zero at the fixed end to a maximum value at the free end.

To shield the crystal from external influences, and also to shield other apparatus from the effects of voltages applied to the crystal electrodes, a substantial portion of the crystal surface which is not otherwise occupied by excitation electrodes, namely, the free end or ends and quadrants normal to the Y (or X) axis, may if desired be provided with a conductive film or coating 15 which may be maintained at ground potential. Thus, in a convenient construction, the crystal is provided with three or more lead-in wires or conductive straps. One strap is connected with the inner tubular electrode 13, another with both of the external quadrantal electrodes 11, and the third with the grounding electrode 15.

The receiving element 7 may be substantially identical with the transmitting element 5. The shielding electrodes of the receiving element help to protect it from electrical influence from the transmitting element, and vice versa.

In operation, a driving voltage of suitable magnitude, frequency and wave form, which may be derived from any suitable apparatus schematically indicated in Fig. 1 by the transmitter 16, is applied by way of leads 17 to the excitation electrodes 11, 13 of the crystal. The frequency of the exciting voltage is preferably chosen to coincide with the fundamental resonant frequency of the crystal. This generates alternating torsional movements of the free end of the crystal with respect to its fixed end. By dragging the fluid film in contact with the crystal in shear, torsional movements are applied to this film. As long as the fluid has the proper characteristics and the dimensions of the wave guide tube 1 are such that the applied frequency is above the cut-off frequency of the guide, torsion waves are launched into the fluid 4 which travel lengthwise of the wave guide tube 1 and exert shearing forces on the receiving crystal 7. By reason of the drag of the fluid medium on the outer surface of the receiving crystal 7, it is constrained to undergo torsional movements which release charges on its electrodes which, in turn, flow by way of leads 18 to an external receiving circuit 19 as an electric current. Thus the current at the receiver 19 may be a substantial replica of the signal current delivered by the transmitter 16 to the driving crystal 5, but delayed in time by the interval required for propagation of the torsional waves from end to end of the wave guide tube 1.

Fig. 3 shows a modification of the apparatus of Fig. 1, principally in the matter of the mounting of the crystals which may individually be the same as the crystals of Fig. 2. To reduce, as far as possible, any mechanical reaction of the rear face of the crystal on the end cap 2 to which it is cemented in Fig. 1, the crystals of Fig. 3 are held in place by the conductive straps 21, 23, 24, fixed to an insulating block 25, which thus constitute not only electric terminals for the electrodes 11, 13 and the shield 15, but also mechanical supports for the crystal element 5 as a whole. With this mounting arrangement, each end of the crystal vibrates in torsion about its central plane, and, at the fundamental frequency of resonance of this "free-free" crystal, the crystal is one-half wavelength (in the crystal) long, the movement being greatest at the ends and zero at the central plane which is therefore a node. The conductive supports 21, 23, 24 are preferably fixed to the exciting electrodes or the shielding film or both, substantially mid-way between the free ends of the crystal; i. e., in the nodal plane. A circular screen 26 provided with a central aperture just large enough to permit free and unobstructed passage of the crystal, is mounted in the central nodal plane. With this construction, only the outer half of the driving crystal contributes to the launching of torsion waves into the fluid 4 and only the outer half of the receiving crystal 7 responds to such waves, because the inner half is undergoing movements in the opposite sense, which serve to provide a dynamic balance for the movements of the useful halves of the crystals. For a given crystal, the fundamental resonant frequency with the central mounting of Fig. 3 is approximately twice that for the end mounting of Fig. 1.

The receiving crystal, its electrode arrangement and its conductive supports may be the same as the transmitting crystal, like parts being indicated by like numerals, distinguished by primes. A cross-sectional view of this arrangement is shown in Fig. 4.

Fig. 5 shows the adaptation of the novel driving element of the invention to the measurement of the various torsion wave-lengths of various liquids; i. e., a torsion wave interferometer. Here, the transmitting end of the wave guide 1 including the crystal 5 may be identical with those of Figs. 1 or 3, the mounting of Fig. 3 being exemplary only. Instead of a receiving crystal, as in Figs. 1 and 3, the distant end of the guide is provided with a manually adjustable reflecting piston 30 to establish a standing wave pattern in the fluid 4. The latter is shown as having a threaded periphery 31 which engages with threads 32 cut in the inner walls of the guide 1. However, any other convenient construction may be employed. The movable reflector 30 may be operated by a shaft 33 to which is fixed a knob 34 which may be provided with graduations 35 each of which corresponds with a certain fractional part of a revolution. The peripheral skirt of the knob, in turn, may be constructed to register against coarse graduations on a scale 36 to indicate complete revolutions. With fine machine work and careful graduating, the position of the reflecting piston 30 corresponding to an integral number of torsion wavelengths as indicated by impedance measurements, may be read from these graduations with great precision. Since in this modification there is only one piezoelectric element, the shielding electrode may be omitted if desired. However, it does not adversely affect the operation of the apparatus.

To measure the impedance of the driving crystal 5 loaded by the liquid wave-supporting medium, any convenient external electrical measuring circuit may be employed. A Wheatstone bridge is shown for the sake of its simplicity. In this bridge circuit, the piezoelectric crystal element 5, loaded or unloaded by the liquid 4, constitutes the "unknown" impedance arm. The other or "standard" arm includes a suitable electrical network, for example, a variable condenser 40 and a variable resistor 41 connected in parallel. These elements should be provided with indicating means to indicate to an operator the value of the capacitance and of the resistance which are inserted in the circuit by adjustment of these elements. The two remaining bridge arms are provided by the two halves of the secondary winding 42 of a transformer 43 whose primary winding 44 is energized by a variable frequency oscillator 45. The mid-point 46 of the secondary winding 42 is grounded, and a suitable indicator, shown as an amplifier 47 which feeds a meter 48 is connected from the point 49 to ground. With these connections the oscillator in effect supplies its voltage across one diagonal of the bridge, while the indicator is connected across the other diagonal. Evidently the separation between piston positions at which current minima or impedance maxima are measured is equal to one-half the torsion wavelength of the particular liquid 4 in the wave guide.

As the position of the reflecting piston is varied, fluid must be added to or withdrawn from the wave guide. For this purpose any suitable mechanism may be employed, for example a feed pipe 50 provided with a stop cock 51.

Figs. 6 and 7 show a composite torsion wave crystal assembly comprising a plurality of concentrically mounted torsion crystals 60 each of which may be cut with its axis of symmetry along the X axis, and provided with conductive plates 61, 62 normal to the Z axis and occupying quadrants of substantially 90 degrees. Because of its thinner walls between inside electrode and outside electrode, each of these crystals has a greatly increased electric field strength inside of its material and, therefore, a greater torsional movement per unit of applied voltage than would be possible with the simple arrangement of Fig. 2. Another advantage is found in the fact that, if the individual tubular crystals are oriented with their Z axes and their exciting electrodes in a staggered arrangement, as shown in Fig. 6, the desired torsional effects of all of the individual tubular crystals are additive while spurious effects, such as those due to stray capacity and undesired lateral oscillations due to elastic coupling are minimized.

The individual tubular crystals 60 may be mounted as by cementing or gluing to a backing plate 65, dynamic balance being obtained by providing at the rear of this backing plate a like plurality of backing rings 66 or tubes of metal or the like. The masses and dimensions of the backing rings are preferably so chosen that their axial lengths are one-quarter wave in the metal, just as the axial lengths of the crystal rings 60 are one-quarter wave in the crystal material. With this arrangement the mounting plate 65 lies in a nodal plane so that energy of the crystal vibrations is not transmitted by way of the mounting plate and lost.

Whatever the wave guide construction and whatever the crystal construction and mounting, certain of the fluids employed may be injurious to the crystals 60 in which case protection of the crystals from the fluid is desirable. To this end the crystals may be immersed in some inactive shear-transmitting medium 67 such as castor oil. The latter medium may be segregated from the principal wave-supporting medium 4 by a diaphragm 68 of rubber, neoprene, or the like, which is capable of transmitting torsional vibrations from the protective oil 67 to the principal wave-supporting fluid. This expedient may if desired be employed with the single crystals of Figs. 1, 3 and 5.

The construction of Figs. 6 and 7 may be employed, if desired, as the driver or receiver element of Fig. 1 or in place of the nodal-plane-supported elements of Figs. 3 and 5 or, instead, in any combination in which it is found appropriate. The crystal shown as used in Figs. 1, 3 and 5 is the simple single crystal of Fig. 2, simply for reasons of simplicity and clarity in the drawing.

As a refinement, in order to restrict the torsion wave propagation in the liquid medium to a single desired mode, for example, the lowest order mode, it is possible with the construction of Figs. 6 and 7 to so adjust the radial distribution of the applied shearing forces that only the desired mode is propagated. Thus, it is known from the theory of wave motions generally that, if propagation takes place only in the fundamental mode, the distribution, along any radius of the guide, of the circuital liquid particle velocity is proportional to the first order, first degree Bessel function of the first kind; i. e., $$v\theta = AJ_1(\mu_1 r)\epsilon - a_{12} \cos(\omega t - \gamma_{12})$$

where $z$ is the direction of propagation,
$\gamma_1$ is the phase constant for the first mode,
$a_1$ is the attenuation constant for the first mode,
$r$ is radial distance from the axis, $$\mu_1 = \frac{3.83}{r_0} \text{ is the modular constant}$$

$r_0$ is the inside radius of the guide,
$\omega = 2\pi f$ is the angular driving frequency.

This type of wave propagation can be secured by so adjusting the shearing forces delivered by the crystal to the liquid at the head or transmitter end of the guide that the circular velocity of the first fluid film is likewise distributed radially in accordance with the first order, first degree Bessel function. To do this it is only necessary, with the construction of Figs. 6 and 7 to energize the separate rings 60 individually with voltages which are correctly proportioned.

The first degree Bessel function is plotted in Fig. 8 to a standard vertical scale of unity for the maximum of the zero degree function, between zero and its first root, 3.83. Samples of this curve taken at points whose abscissae are 0.7, 1.4, 2.1, 2.8 and 3.5, corresponding respectively to radii given by $r/r_0 = .182$, $r/r_0 = .365$, $r/r_0 = .549$, $r/r_0 = .730$, $r/r_0 = .913$, have the values of 0.329, 0.542, 0.568, 0.409 and 0.137. A voltage divider network 70 energized from an oscillator 16 may be provided to supply to each of the individual tubular crystals 60 the appropriate fraction of the total available voltage to cause that crystal to undergo a corresponding fraction of the movement which it would undergo if excited directly, for example from the source 16. Such a voltage divider is indicated in Fig. 7, where no attempt is made to indicate the exact numerical relations.

As many separate tubular crystals 60 separately energized with correctly proportioned voltages, may be employed as desired, and the greater their number, the more perfectly do the shearing forces applied to the liquid follow the Bessel function distribution required for propagation in the simplest mode.

The same principles may be applied to the receiving element, the only change being to substitute a suitable receiver for the transmitter 16. When the output voltages of the individual tubular crystals are supplied to this receiver by way of a correctly proportioned voltage divider instead of directly, contributions to the received signal from waves of modes other than the desired mode are mutually nullified, while contributions from the wave of the desired mode are additive. For a given mode, the apportionment of the receiver voltage divider may be the same as that of the transmitter voltage divider.

What is claimed is:

1. An interferometer for fluid torsional waves which comprises a cylindrical conduit having a transmitter end and a reflector end, said transmitter end being fixedly closed, a piezoelectric torsional vibrator having plate electrodes mounted on its faces, said vibrator having the form of a right circular cylinder and being located coaxially within the transmitter end of said conduit for launching torsional waves into a fluid contained in said conduit, the material of said vibrator being selected to minimize undesired compressional vibrations thereof, a plurality of conductive supports for said vibrator, one end of each of said supports being mechanically fixed to and electrically insulated from the conduit wall at the transmitter end of the conduit, each of said supports extending within the conduit to a nodal plane normal to the axis of the vibrator and midway between its ends and being there mechanically fixed and electrically connected to one of said plate electrodes, whereby vibrations undergone by said vibrator are not transmitted to said supports, a torsional wave reflecting piston adjustably and coaxially mounted within said conduit closing the reflector end thereof, means for controllably adjusting the axial separation of said piston from the transmitter end of said conduit, a torsional wave supporting fluid entirely filling that portion of the interior of the conduit which is bounded by said reflector, a source of electric energy located outside of said conduit and connected by way of said conductive supports to electrodes of said vibrator, and electric circuit impedance measuring means connected to said supports for determining the impedance presented by said vibrator to said energy source for various degrees of axial separation of said reflector from said vibrator, thereby to determine the reaction of the fluid under test on said vibrator.

2. In combination with the apparatus defined in claim 1, an annular screen interiorly fixed to the wall of said conduit substantially in the nodal plane of said vibrator, said vibrator projecting through the aperture of said screen to each side thereof, said screen being arranged substantially to isolate fluid wave phenomena on one side of said screen from fluid wave phenomena on the other side of said screen.

3. Apparatus as defined in claim 1 wherein the vibrator is a cylinder of piezoelectric material.

4. Apparatus as defined in claim 1 wherein the vibrator is a cylinder of crystalline ammonium dehydrogen phosphate having its axis of symmetry along the X crystal axis and plate electrodes normal to the Z crystal axis.

5. Apparatus as defined in claim 1 wherein the vibrator is a cylinder of crystalline ammonium dihydrogen phosphate having a cylindrical bore therethrough, a central electrode mounted on a surface of the bore and wherein said plate electrodes, to which said supports are fixed, are oppositely mounted on the outer surface of the cylinder, each of said outer electrodes extending through an arc of substantially 90 degrees, the line joining the centers of said electrodes being substantially coincident with the crystal Z axis.

WARREN P. MASON.

REFERENCES CITED

The following references are of record in the file of this patent:

UNITED STATES PATENTS

| Number | Name | Date |
| --- | --- | --- |
| 2,340,992 | Siegel | Feb. 8, 1944 |
| 2,394,461 | Mason | Feb. 5, 1946 |
| 2,490,452 | Mason | Dec. 6, 1949 |
| 2,518,348 | Mason | Aug. 8, 1950 |
| 2,536,025 | Blackburn | Jan. 2, 1951 |

OTHER REFERENCES

Article entitled Supersonic Interferometers, Klein et al., Physical Review, vol. 37, issue of March 15, 1931, page 760.